United States Patent
Keller (10) Patent No.: US 10,169,157 B2
(45) Date of Patent: *Jan. 1, 2019

(54) EFFICIENT STATE TRACKING FOR CLUSTERS

(71) Applicant: INTERNATIONAL BUSINESS MACHINES CORPORATION, Armonk, NY (US)

(72) Inventor: Michael Keller, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,481

(22) Filed: Nov. 7, 2017

(65) Prior Publication Data

US 2018/0095831 A1 Apr. 5, 2018

Related U.S. Application Data

(63) Continuation of application No. 13/782,221, filed on Mar. 1, 2013, now Pat. No. 9,875,159, which is a continuation of application No. 13/351,132, filed on Jan. 16, 2012, now Pat. No. 9,842,025.

(51) Int. Cl.
    *G06F 15/167* (2006.01)
    *G06F 11/14* (2006.01)

(52) U.S. Cl.
    CPC ...... *G06F 11/1438* (2013.01); *G06F 2201/84* (2013.01)

(58) Field of Classification Search
    CPC .................. G06F 11/1438; G06F 15/17331

USPC ........................................................ 709/213
See application file for complete search history.

(56) References Cited

U.S. PATENT DOCUMENTS

| 5,699,552 | A | 12/1997 | Whittaker |
| 5,900,020 | A | 5/1999 | Safranek et al. |
| 5,918,229 | A | 6/1999 | Davis et al. |
| 6,148,377 | A | 11/2000 | Carter et al. |

(Continued)

OTHER PUBLICATIONS

Heman et al., "Information Systems—Positional Delta Trees to reconcile updates with read-optimized data storage," Report INS-E081, Centrum voor Wiskunde en Informatica (CWI), Aug. 2008 (15 pages).

(Continued)

*Primary Examiner* — Francisco J Aponte
(74) *Attorney, Agent, or Firm* — Griffiths & Seaton PLLC (57) ABSTRACT

Exemplary method, system, and computer program product embodiments for efficient state tracking for clusters are provided. In one embodiment, by way of example only, in a distributed shared memory architecture, an asynchronous calculation of deltas and the views is performed while concurrently receiving client requests and concurrently tracking the client requests times. The results of the asynchronous calculation may be applied to each of the client requests that are competing for data of the same concurrency during a certain period with currently executing client requests. A latency is bound for the client requests by a time necessitated for the asynchronous calculation of at least two of the deltas where a first state snapshot is atomically taken while simultaneously calculating the at least two of the deltas.

15 Claims, 4 Drawing Sheets

(56) References Cited

U.S. PATENT DOCUMENTS

| | | |
|---|---|---|
| 6,205,528 B1 | 3/2001 | Kingsbury et al. |
| 6,366,901 B1 | 4/2002 | Ellis |
| 6,493,809 B1 | 12/2002 | Safranek et al. |
| 6,505,286 B1 | 1/2003 | Kingsbury et al. |
| 6,546,402 B1 | 4/2003 | Beyer et al. |
| 6,785,888 B1 | 8/2004 | McKenney et al. |
| 6,904,449 B1 | 6/2005 | Quinones |
| 7,269,698 B2 | 9/2007 | Hum et al. |
| 7,395,391 B2 | 7/2008 | Zohar et al. |
| 7,472,233 B2 | 12/2008 | McKenney et al. |
| 7,523,094 B1 | 4/2009 | Theimann et al. |
| 7,739,262 B2 | 6/2010 | Larson et al. |
| 7,792,847 B2 | 9/2010 | Dickerman et al. |
| 7,930,297 B2 | 4/2011 | Yu et al. |
| 8,468,313 B2 | 6/2013 | Yim et al. |
| 8,799,922 B2 * | 8/2014 | Rajan .................. G06F 9/52 707/610 |
| 8,838,800 B2 | 9/2014 | Carruthers |
| 8,856,234 B2 * | 10/2014 | Kluin .................. G06F 17/246 709/204 |
| 9,225,774 B2 * | 12/2015 | Kluin .................. G06F 17/246 |
| 9,392,052 B2 * | 7/2016 | Kluin .................. G06F 17/246 |
| 9,531,597 B2 * | 12/2016 | Donze .................. H04L 41/12 |
| 9,531,795 B2 * | 12/2016 | Kluin .................. G06F 17/246 |
| 9,626,257 B1 * | 4/2017 | Tang .................. G06F 11/20 |
| 2001/0013049 A1 | 8/2001 | Ellis, III |
| 2006/0031509 A1 | 2/2006 | Ballette et al. |
| 2006/0080345 A1 | 4/2006 | Murthy et al. |
| 2006/0294058 A1 | 12/2006 | Zabback et al. |
| 2007/0038598 A1 | 2/2007 | Liang |
| 2010/0049718 A1 | 2/2010 | Aronovich et al. |
| 2011/0060881 A1 | 3/2011 | Gallagher |
| 2011/0185355 A1 | 7/2011 | Chawla et al. |
| 2012/0166390 A1 | 6/2012 | Merriman et al. |
| 2012/0197868 A1 | 8/2012 | Fauser et al. |
| 2012/0330995 A1 | 12/2012 | Muenkel |

OTHER PUBLICATIONS

Nicolae, "BlobSeer: Towards efficient data storage management for large-scale, distributed systems," Computer Science [cs], Université de Rennes, Jan. 5, 2011 (170 pages).

Unknown, "AS/400 manages storage—iSeries Information Center," as400bks.rochester.ibm.com/html/as400/v4r5/ic2924/index.htm?info/RZAHQSTORMGTCONCEPT.HTM, Feb. 1, 2001 (2 pages).

* cited by examiner

EFFICIENT STATE TRACKING FOR CLUSTERS

CROSS REFERENCE TO RELATED APPLICATIONS

This application is a Continuation of U.S. patent application Ser. No. 13/782,221, filed on Mar. 1, 2013, which is a Continuation of U.S. patent application Ser. No. 13/351,132, filed on Jan. 16, 2012.

FIELD OF THE INVENTION

The present invention relates generally to computers, and more particularly, to efficient state tracking for clusters in a computing environment.

DESCRIPTION OF THE RELATED ART

In today's society, computer systems are commonplace. Computer systems may be found in the workplace, at home, or at school. Computer systems may include data storage systems, or disk storage systems, to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to mange the flow of data. Moreover, the computer system may include a complex data processing system or computing environment. A data processing system often requires computational resources or availability requirements that cannot be achieved by a single computer.

SUMMARY OF THE DESCRIBED EMBODIMENTS

As previously mentioned, a computer system may include a complex data processing system or computing environment. The data processing system often requires computational resources or availability requirements that cannot be achieved by a single computer. In such cases, a number of computers and storage systems may be architecturally arranged to form a cluster for networking several data processing systems together for the purpose of providing continuous resource availability and for sharing workload. Within the cluster deployment, for example, a cluster may be one node or, more commonly, a set of multiple nodes coordinating access to a set of shared storage subsystems. In a clustered environment, states may be replicated across the nodes of the cluster in form of distributed shared memory (DSM) providing efficient access to the shared state for all applications on every node. The way in which externally hosted applications ("clients", e.g., a management application or user front end) track a cluster's state presents a serious challenge.

Accordingly, and in view of the foregoing, various method, system, and computer program product embodiments for efficient state tracking for clusters are provided. In one embodiment, by way of example only, in a distributed shared memory architecture, a method comprises performing an asynchronous calculation of deltas while concurrently receiving client requests and concurrently tracking client requests times; responding to each of the client requests for data of the same concurrency during a certain period with currently executing client requests with updated views based upon results of the asynchronous calculation; and bounding a latency for the client requests by a time necessitated for the asynchronous calculation of at least two of the deltas; wherein a first state snapshot is atomically taken while simultaneously calculating the at least two of the deltas, and each of the client requests received during the certain period are served with the updated views of the asynchronously calculated at least two of the deltas.

Additional system and computer program product embodiments are disclosed and provide related advantages.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

A distributed shared memory (DSM) presents an area of shared memory for two or more servers in the cluster. DSM may be superior even when compared to pure-in-memory database as it exposes all data into the virtual address space of a process. Thus, the need to query data in a particular language (e.g., SQL) through a database service is eliminated. Within a clustered appliance, states may be replicated across the nodes of the cluster in form of the DSM providing efficient access to the shared state for all applications on every node. The data in this memory may be structured as a tree of arbitrary complex structure, for example, or with rows of tables (similar to relational databases). Transactional services may ensure that the DSM is at all times consistent across all nodes. However, as mentioned previously, the manner and method in which externally hosted applications ("clients", e.g., a management application or user front end) track a cluster's state presents a serious challenge. It should be noted that the definitions described herein are applicable to the illustrated embodiments by way of example, and other definitions, as commonly understood in the art, may be applicable as well for describing the functionality and purpose of the illustrated embodiments of the present invention.

In one embodiment, by way of example only, the mechanisms of the illustrated embodiments serve to distinguish between internally visible data ("state") and externally visible data ("views"). The internally visible data (called "state") is the ensemble of variables needed to represent the internal state of every application in the cluster. The internally visible data is stored in the DSM and governed by its transactional services. Sharing the state across the cluster allows applications to coordinate their actions and enables seamless failover in the face of hardware and/or software failures. Conversely, the externally visible data (called "views") is a representation of the state tailored for management and monitoring applications, and thus, ultimately for the human user. The views are calculated from the state by filtering, restructuring, aggregation, or simple transformations, such as translation into different units. The views are stored in the memory of the application providing the views, and specifically, not in the DSM.

Where these views are very voluminous, the clients may require a way to track them by querying differential updates instead of full updates. Applying such differential updates ("deltas") allows clients to maintain a local replica of the appliance's views. The deltas may be the difference between two views. Such deltas are kept in a circular buffer on the appliance. If a client requests a delta across a transaction range not covered by the buffer (because of its limited size), a full view resynchronization is needed.

In one embodiment, by way of example only, the implementation of such a scheme may require that views and deltas are recalculated after every transaction by the node initiating the transaction and distributed as part of the DSM. By this scheme, the views and deltas may be trivially consistent across the cluster and ensured by the same transactional services used for the state itself (i.e., views and deltas are part of the state). However, the calculation of the views may be complex and take significant time. Moreover, as the views perform aggregations, updating the views has a near constant cost, which is independent of transaction size.

In situations where fast transactions are a necessity for an efficient functioning of the appliance, calculating the views and deltas in a critical path (e.g., synchronous calculation) may present various problems. Specifically, the synchronous calculation may dominate the cost of a transaction itself and thus severely limit the effectiveness of the appliance.

Thus, in a distributed shared memory architecture, the mechanisms of the present invention provide for an asynchronous calculation of the views, as well as the deltas (the difference between the newly calculated views and the previously calculated views). While at all times only one copy of the views (the most recent one) is kept in memory, the deltas are kept in a circular buffer large enough to keep deltas for many recalculations of the views. This allows clients to forward their replica of the views using deltas only, provided they query such deltas before the circular buffer is exhausted.

Client requests are received asynchronously to the calculations. When a request is received, the arrival time, or equivalently, the sequence number of the most recent state transaction, is recorded. Unanswered requests are kept in a queue. Requests are answered whenever a view of sufficient currency becomes available, which may be either immediately (the current view is already based on the most recent transaction); or once the current calculation finishes (the current calculation incorporates this transaction); or once the next calculation (yet to be started) finishes (the current view is out of date, and an ongoing calculation, if any, is based on an older transaction). The upper bound for the response latency for any request is thus intrinsically the time required for two view calculations (ignoring network delays). While no requests are pending, view calculations are not performed. The use of the term "currency" rather than "concurrency" is intentional. In one embodiment, use of the term "currency" is intended to refer to (among other things) the degree of how current something is, while "concurrency" is about two things co-occurring.

In one embodiment, the mechanisms take the asynchronous calculation of views and deltas out of the critical transaction path, performing them asynchronously instead of synchronously. Since this allows transactions to be performed at a much faster rate, the implication is that views and deltas cannot be calculated after every transaction. Moreover, the calculations of views and deltas may be performed only on demand thereby implicitly folding deltas to the maximum degree.

Figure 1:
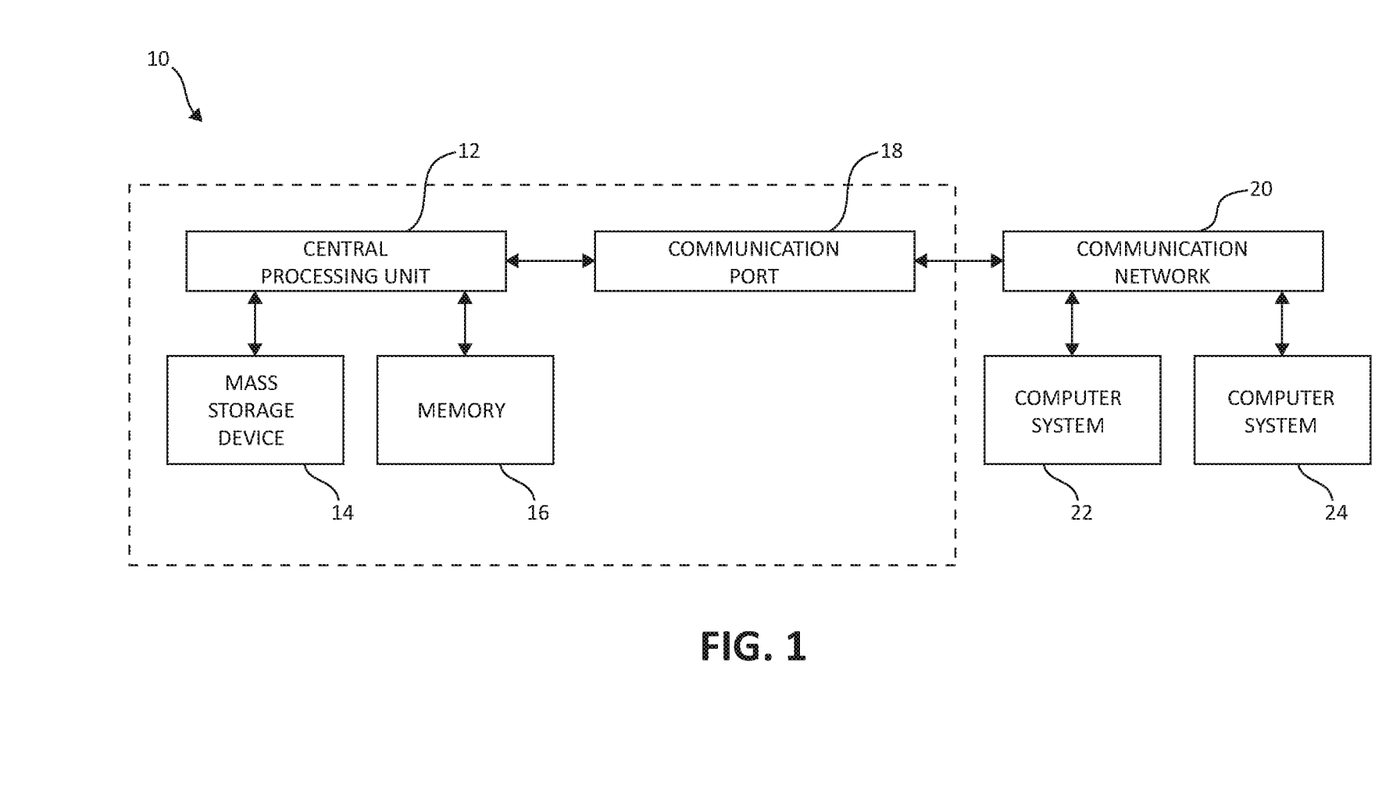
FIG. 1 illustrates a computer environment having an example storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 2:
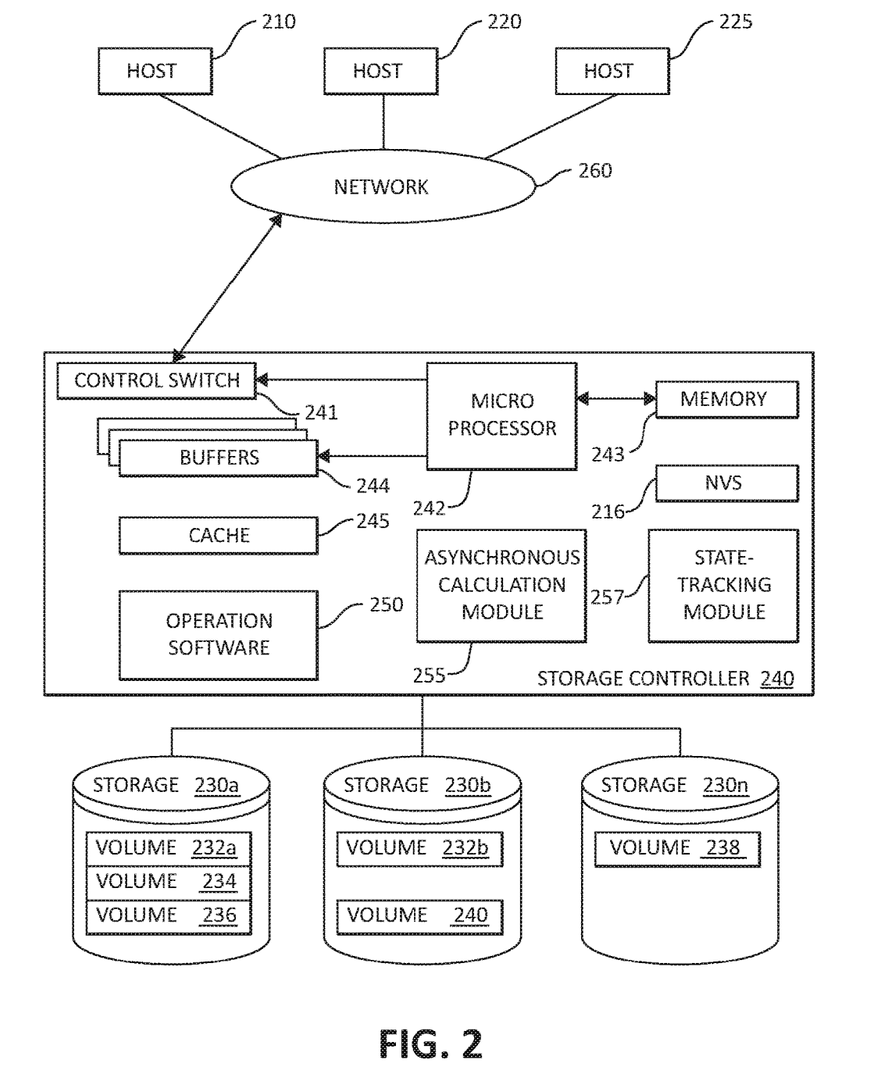
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG.

2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include an asynchronous calculation module 255 and state-tracking module 257. The asynchronous calculation module 255 and state-tracking module 257 may work in conjunction with each and every component of the storage controller 240, the hosts 210, 220, 225, and storage devices 230. Both the asynchronous calculation module 255 and state-tracking module 257 may be structurally one complete module or may be associated and/or included with other individual modules. The asynchronous calculation module 255 and state-tracking module 257 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and asynchronous calculation module 255 and state-tracking module 257 in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via a switch called "fabric."

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, asynchronous calculation module 255 and state tracking module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

In one embodiment, the views are updated. An asynchronous calculation of deltas and views is performed. Concurrently, client requests are received and their times of arrival are tracked. The results of the asynchronous calculation may be applied to each of the client requests that are competing for data of the same concurrency during a certain period with currently executing client requests. This embodiment is outlined in the FIG. 3, as described below.

Figure 3:
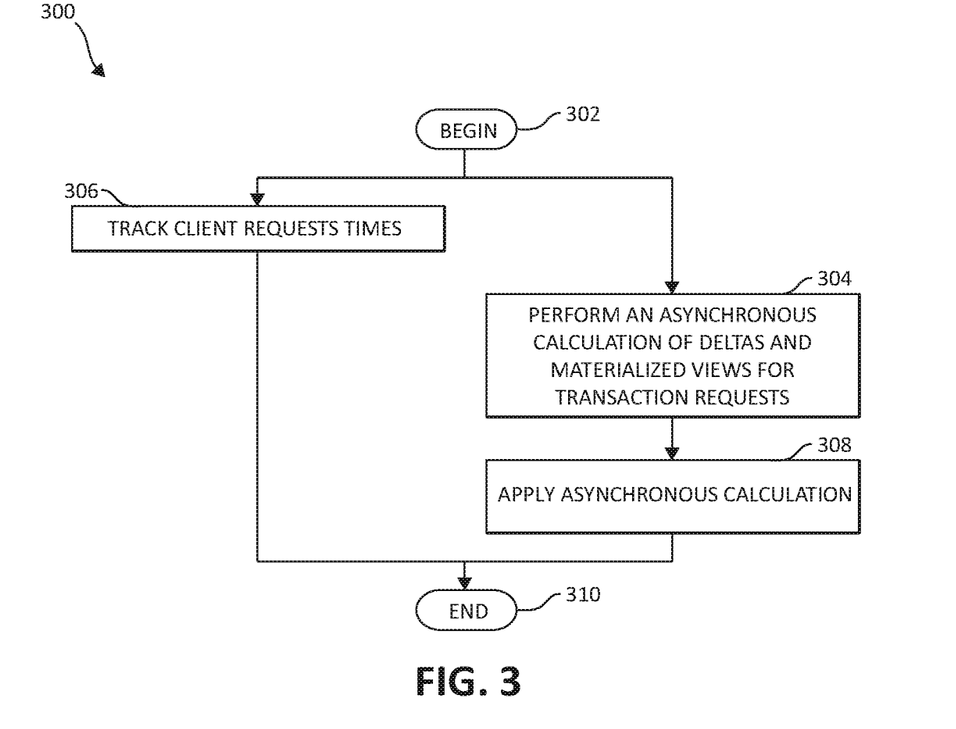
FIG. 3 is a flowchart illustrating an exemplary method for efficient state tracking for clusters.

FIG. 3 is a flowchart illustrating an exemplary method 300 for efficient state tracking for clusters. The method 300 begins (step 302). An asynchronous calculation of deltas and the views is performed (step 304). The views may be calculated from the state by filtering, restructuring, aggregation, or simple transformations, such as translation into different units. The views are stored in the memory of the application providing the views, and specifically, not in the DSM. Concurrently and/or in parallel, client requests are received and the client requests times are tracked (step 306). It should be noted that the tracking of the client request may be performed in parallel with the other operations and steps described herein. The results of the asynchronous calculation may be applied to each of the client requests that are competing for data of the same concurrency during a certain period with currently executing client requests (step 308). The method 300 ends (step 310).

With an asynchronous calculation of views and deltas, the transaction rate may be too fast for the calculation of views and deltas to finish before the next transaction arrives. Recording the state after each transaction (to buffer calculations) may not be a possibility, as it requires a theoretically unbounded amount of memory. For example, consider the following four transactions:
1. add row A with value 1
2. change row A to value 2 and add row B with value 1 (value 3)
3. remove row A and change row B to value 4
4. remove row B Assume that the view calculation is trivial in this case (i.e., the identity function). Now assume that in node X of a cluster the timings are such that the deltas are calculated after transactions 2 and 4. In node Y, deltas are calculated only after transaction 4. Thus, the deltas may be folded. The following reflect the "folded deltas" that these nodes compute:

Node X:
1-2. add to row A (value 2), add to row B (value 3)
3-4. remove row A, remove row B
Node Y:
1-4. - - - -

Specifically, in Node Y, the folding was such that the resulting delta was empty. It is important to realize that deltas are not calculated from "elementary deltas" (i.e., a transaction log). If they were, it would simply imply a theoretically unbounded memory region to store the log of elementary deltas. Rather, the deltas are calculated by direct comparison between snapshots of state and views, a "most recent" snapshot (from the time when the calculation was started), and a "previous" snapshot (the most recent snapshot from previous calculation). Thus, the space requirement is precisely two full copies of DSM and views.

In a general sense, folding may be described as the process of combining several alterations of the same data into a simpler resulting (net) difference. Folding is not achieved by actually combining such alterations, but is incurred implicitly by comparing the new state to the old state. This state comparison will yield the net difference, rather than the potentially many alterations that took place in between.

In one embodiment, the folding provides a valuable tool for view tracking as it reduces the amount of data that needs to be transmitted to the clients. Also, the folding allows for a reduction in the exhaustion of circular buffers of deltas. However, because of the lack of coordination across nodes, delta sets vary from node to node. Specifically in the above example, it would be impossible to query node Y for the "delta since transaction 2", as this transaction was folded into a single indivisible delta for transactions 1-4. The same clients querying the same node is a necessity. However, this is unproblematic in terms of load balancing, as load balancing is about balancing many clients, rather than balancing many requests from one client (who has limited bandwidth).

Thus, in one embodiment, the calculations of views and deltas may be performed as soon as a calculation is complete and then the next calculation may commence (for whichever transaction is the most recent). In so doing, the mechanisms of the present invention preform an on-demand calculation. In other words, the asynchronous calculation may be performed only once a request for "deltas since transaction X" is received. This on-demand calculation leads to the maximum amount of folding achievable.

The mechanisms of the present invention also seek to address and improve efficiency upon concurrent requests by multiple clients on the same node. For example, on a particular node, consider that at time t1, a request from client C1 is received. Immediately, a view and delta calculation may be started (for current transaction T1). Shortly afterwards, at time t2, a request from client C2 is received. At time t3 (still during the calculation) a new transaction T2 arrives at the DSM. At time t4 the calculation of view and delta for T1 finished, and C1 is served. Now the crucial observation is that C2's request was received at a time where T1 was still the "current" transaction. Thus, it is permissible to also serve C2 with delta and view for T1, rather than calculating view and delta for T2.

In one embodiment, the mechanisms do not record the "current transaction at request time" for each request. In the event of a flurry of requests and assuming a steady flow of transactions at a higher rate than completion of calculations for the views and deltas, the mechanism seek to avoid calculating views and deltas for every single request, leading to requests being delayed by the number of queued requests times the time for the view and delta calculations. Conversely, the latency for a request may be bounded by the time needed for exactly two views and delta calculations (in the worst case where t1<t3<t2 in very narrow succession). Such concepts are further explained below in FIG. 4.

Figure 4:
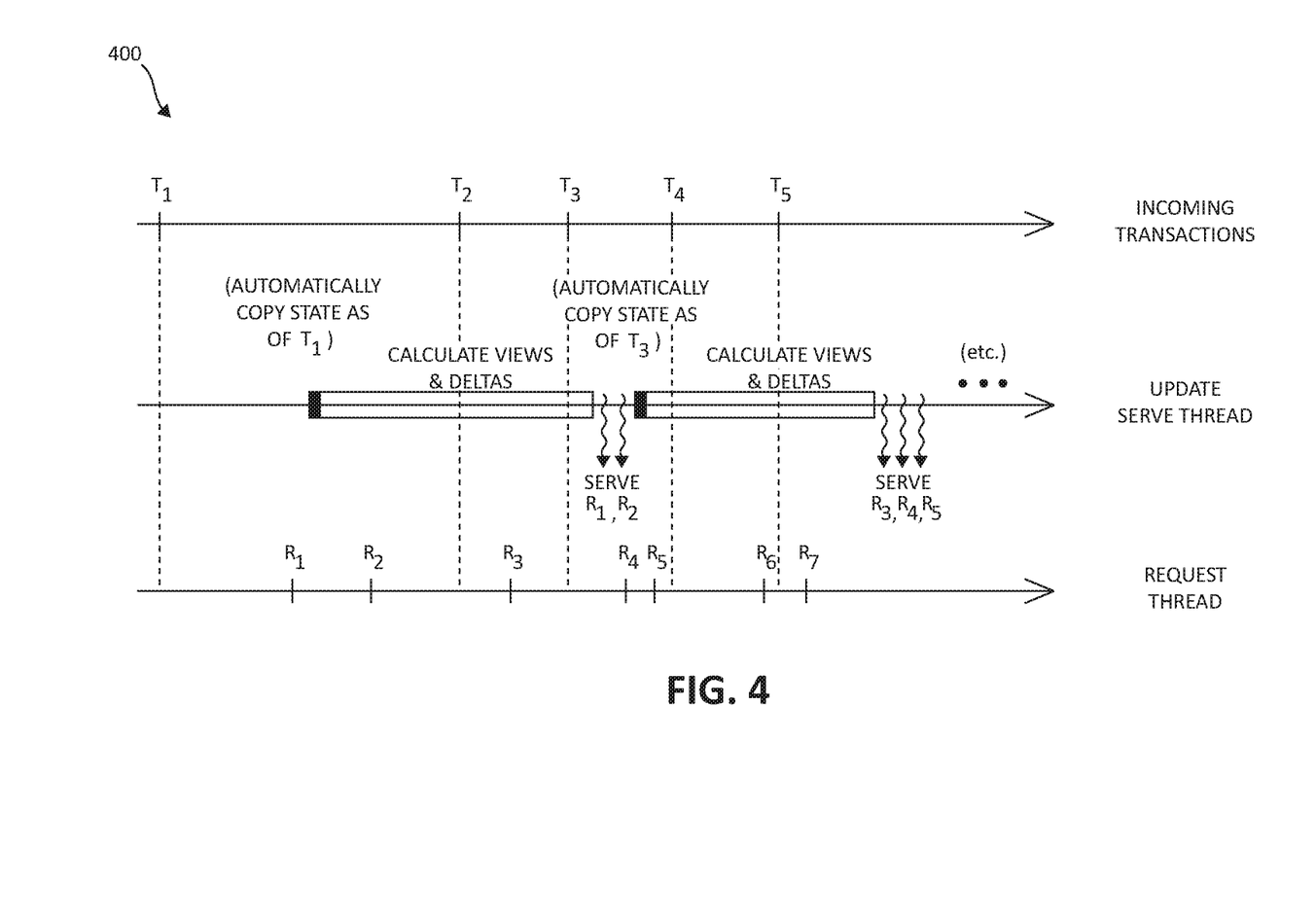
FIG. 4 is an exemplary time-line diagram illustrating the asynchronous constituent processes of the method, with time advancing from left to write.

FIG. 4 is an exemplary time-line diagram illustrating the asynchronous constituent processes of the method, with time advancing from left to right. In one embodiment, by way of example only, three asynchronous processes (represented as the large arrows), with time advancing from left to right, are depicted. The first asynchronous process is the stream of transactions, as perceived in the present node. The second asynchronous process is the "update-serve" (US) thread, which alternates between calculating views & deltas and serving queued queries. The third asynchronous process is the thread that receives queries, records the queries run times (or current transaction) at the time of receipt, and queues them.

Initially the US thread is idle, as the request queue is empty (no pending request). Now the mechanisms of the illustrated embodiments receive R1; this triggers the US thread to calculate views & deltas based on the most recent transaction. (emphasis added). The mechanisms will first, atomically take snapshots of the current state (by whichever technique is applied). The views and deltas will be calculated on the snapshot, as the DSM may move on during the calculation, which it does so in this example. Next, the US thread performs the lengthy calculation of views and deltas. Meanwhile the mechanisms have the following events: R2, T2, R3, T3 (in this order). After the calculation on the US thread is finished, the thread may serve R1 and R2. R2 may be served from the same image (views and deltas), as it arrived before T2.

On the other hand, R3 may not be served based on the same image, as it arrived after T2. Next, after serving R1 and R2, the US thread will once again atomically take a snapshot of the state (discarding the previous snapshot). However, it should be noted the mechanisms atomically take snapshots of the state based on the most recent transaction T3, rather than T2—even though R3 came in before T3. (emphasis added). The advantage is obvious. In this way, additional requests (that are yet to come) may be served by the same image T3 (and R4, R5 indeed will). On the other hand, if the mechanisms could snapshot T2 (which it could not do since it is too late), then any future requests would surely require yet another calculation, as T3 has already arrived.

The more interesting question is why is it correct to serve the T3 state to a request that arrived before T3? This is in the nature of asynchronous systems: if a client makes a request that (on the user side) begins at t_begin and returns at t_end, then it cannot have any expectation as to when exactly anything was executed on the server side—it could be that the network delays were such that most of the time elapsed before the server even saw the request, and everything happened right at t_end; or vice versa. The entire time is essentially a blackout period for the client, during which, at some point, the request was executed. Thus, in this case, where R3 comes in while T2 was current, and returns when T5 is current, any transaction level between T2 and T5 would be a valid answer.

Returning to the example and FIG. 4, during the calculation for the state T3, the mechanisms have the following events: R4, R5, T4, R6, T5, R7 (in this order). Since both R4 and R5 arrive before T4, these can be served along with R3 (based on transaction T3). R6 and R7 however need to be served after yet another calculation (not illustrated in FIG. 4). This calculation would be based on T5 (again the most recent transaction).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for efficient state tracking for clusters by a processor device in a distributed shared memory architecture, the method comprising:
   performing an asynchronous calculation of deltas while concurrently receiving client requests and concurrently tracking client requests times;
   responding to each of the client requests for data of the same concurrency during a certain period with currently executing client requests with updated views based upon results of the asynchronous calculation; concurrently executing each of the client requests occurring after the certain period on the updated views, wherein all deltas and views are updated; and
   bounding a latency for the client requests by a time necessitated for the asynchronous calculation of at least two of the deltas; wherein a first state snapshot is atomically taken while simultaneously calculating the at least two of the deltas, and each of the client requests received during the certain period are served with the updated views of the asynchronously calculated at least two of the deltas.

2. The method of claim 1, further including, in conjunction with the performing, folding the deltas in response to receiving client requests.

3. The method of claim 1, further including, performing the asynchronous calculation for the deltas by using a direct comparison between one of a plurality of snapshot states and the views, wherein the plurality of snapshot states include at least one of a most recent snapshot and a previous snapshot.

4. The method of claim 1, further including performing the asynchronous calculation on demand.

5. The method of claim 1, further including performing the asynchronous calculation only upon receipt of the client requests for the deltas calculated since a specified client request.

6. A system for efficient state tracking for clusters in a distributed shared memory architecture, comprising:
   a processor device executing instructions stored in the distributed shared memory architecture, wherein when executed, the instructions cause the processor device to:
      perform an asynchronous calculation of deltas while concurrently receiving client requests and concurrently tracking client requests times;
      respond to each of the client requests for data of the same concurrency during a certain period with currently executing client requests with updated views based upon results of the asynchronous calculation; concurrently execute each of the client requests occurring after the certain period on the updated views, wherein all deltas and views are updated; and
      bound a latency for the client requests by a time necessitated for the a synchronous calculation of at least two of the deltas; wherein a first state snapshot is atomically taken while simultaneously calculating the at least two of the deltas, and each of the client requests received during the certain period are served with the updated views of the asynchronously calculated at least two of the deltas.

7. The system of claim 6, wherein the processor device, in conjunction with the performing, folds the deltas in response to receiving client requests.

8. The system of claim 6, wherein the processor device performs the asynchronous calculation for the deltas by using a direct comparison between one of a plurality of snapshot states and the views, wherein the plurality of snapshot states include at least one of a most recent snapshot and a previous snapshot.

9. The system of claim 6, wherein the processor device performs the asynchronous calculation on demand.

10. The system of claim 6, wherein the processor device performs the asynchronous calculation only upon receipt of the client requests for the deltas calculated since a specified client request.

11. A computer program product for efficient state tracking for clusters in a distributed shared memory architecture by a processor device, the computer program product comprising a non-transitory computer-readable storage medium having computer-readable program code portions stored therein, the computer-readable program code portions comprising:
   an executable portion that performs an asynchronous calculation of deltas while concurrently receiving client requests and concurrently tracking client requests times;
   an executable portion that responds to each of the client requests for data of the same concurrency during a certain period with currently executing client requests with updated views based upon results of the asynchronous calculation;
   an executable portion that concurrently executes each of the client requests occurring after the certain period on the updated views, wherein all deltas and views are updated; and
   an executable portion that bounds a latency for the client requests by a time necessitated for the asynchronous calculation of at least two of the deltas; wherein a first state snapshot is atomically taken while simultaneously calculating the at least two of the deltas, and each of the client requests received during the certain period are served with the updated views of the asynchronously calculated at least two of the deltas.

12. The computer program product of claim 11, further including an executable portion that, in conjunction with the performing, folds the deltas in response to receiving client requests.

13. The computer program product of claim 11, further including an executable portion that performs the asynchronous calculation for the deltas by using a direct comparison between one of a plurality of snapshot states and the views, wherein the plurality of snapshot states include at least one of a most recent snapshot and a previous snapshot.

14. The computer program product of claim 11, further including an executable portion that performs the asynchronous calculation on demand.

15. The computer program product of claim 11, further including an executable portion that performs the asynchronous calculation only upon receipt of the client requests for the deltas calculated since a specified client request.

\* \* \* \* \*